United States Patent [19]

McCarroll

[11] 4,282,628
[45] Aug. 11, 1981

[54] TILTED AXLE CASTER

[75] Inventor: Raymond A. McCarroll, Grosse Pointe Woods, Mich.

[73] Assignee: Herder N.V., Netherlands Antilles

[21] Appl. No.: 906,365

[22] Filed: May 17, 1978

Related U.S. Application Data

[60] Division of Ser. No. 845,427, Oct. 25, 1977, Pat. No. 4,144,617, which is a continuation-in-part of Ser. No. 748,165, Dec. 7, 1976, abandoned.

[51] Int. Cl.$^2$ .............................................. B60B 33/00
[52] U.S. Cl. ....................................... 16/18 A; 16/29; 16/39
[58] Field of Search ............... 16/18 R, 18 CG, 18 A, 16/45, 29, 47, 46, 37, 38, 39, 31 R

[56] References Cited

U.S. PATENT DOCUMENTS

| 2,484,189 | 10/1949 | Shepherd | 16/18 A |
| 3,054,135 | 9/1962 | Shepherd | 16/18 R |
| 3,161,907 | 12/1964 | Anthony | 16/18 A |
| 3,177,516 | 4/1965 | Price et al. | 16/18 A |
| 4,144,617 | 3/1979 | McCarroll | 16/18 A |

FOREIGN PATENT DOCUMENTS

| 1312550 | 11/1962 | France | 16/45 |
| 876282 | 8/1961 | United Kingdom | 16/18 A |

Primary Examiner—George H. Krizmanich
Attorney, Agent, or Firm—McWilliams, Mann and Zummer

[57] ABSTRACT

An enclosed axle, inclined wheel caster including a generally disc like pivot support, or body frame member, which may be flat or dished, carrying an axle and a supporting wheel member rotatably mounted on the axle, both of such members being made from stampings, moulding or forgings and a cover formed of opposed saucers, or cupped members, or combinations of these forms, attached to each of the members to give the swivelable caster a generally enclosed form. As an alternative form of the invention, one or both the body frame member and the supporting wheel member may be made as castings, or mouldings each having light weight opposed saucers, cupped, bulged or non-bulged truncated cone forms attached thereto to provide a covering for the body frame and axle of the completed caster.

14 Claims, 31 Drawing Figures

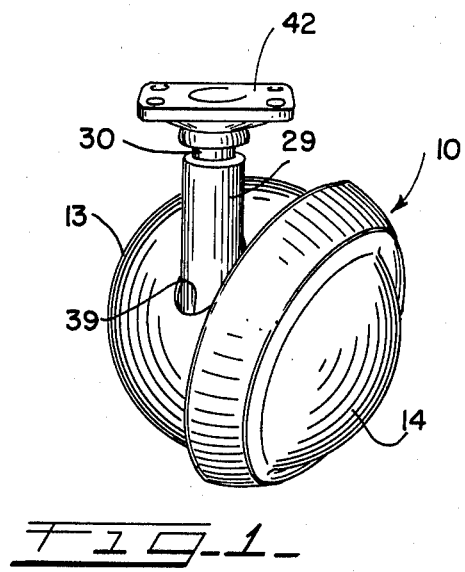
Fig-1
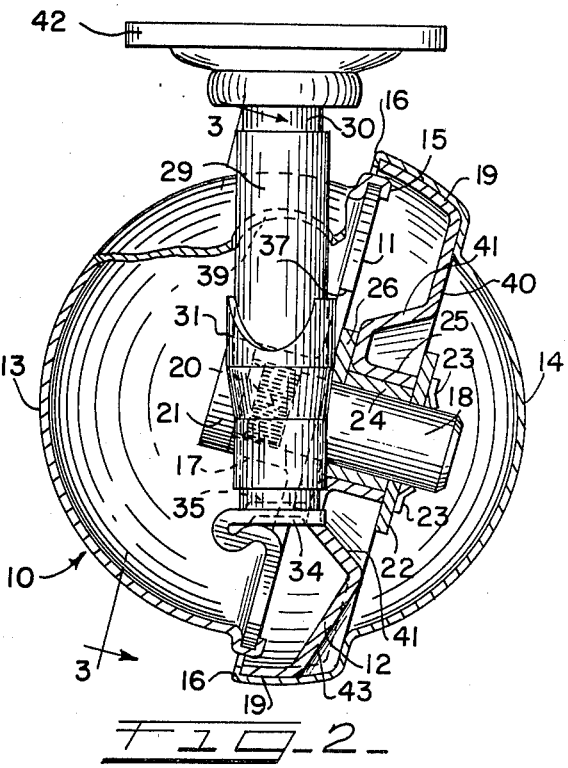
Fig-2
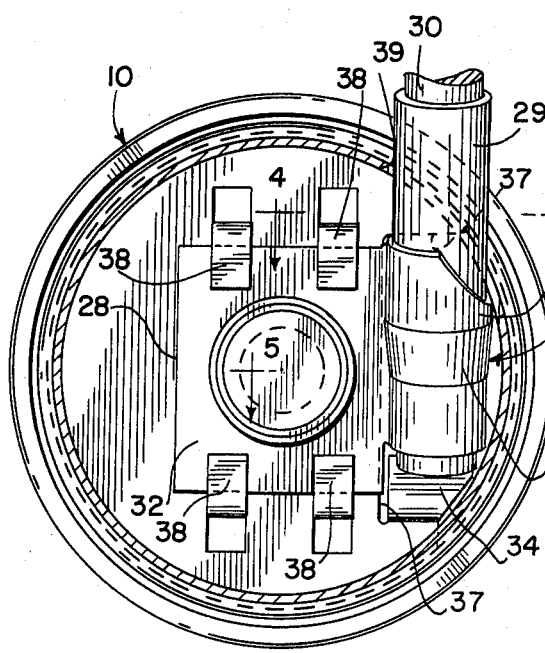
Fig-3
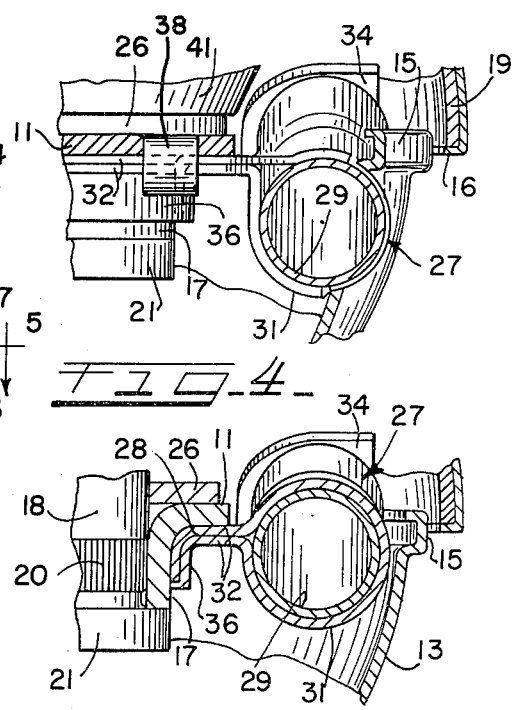
Fig-4
Fig-5

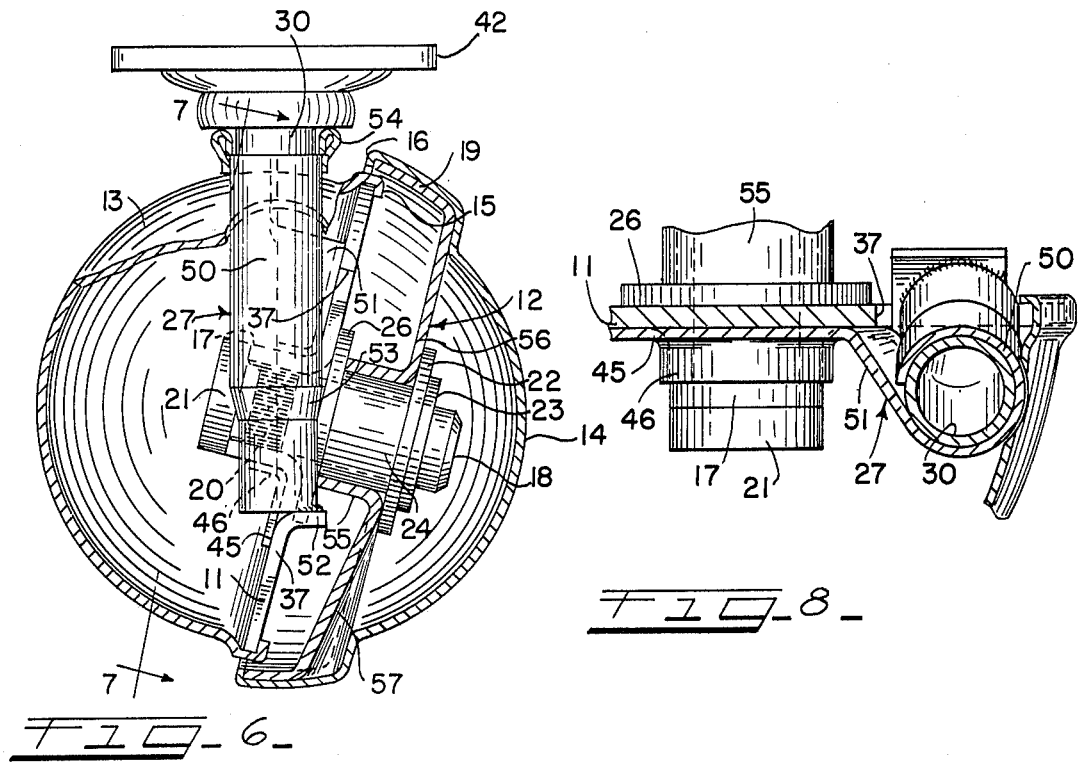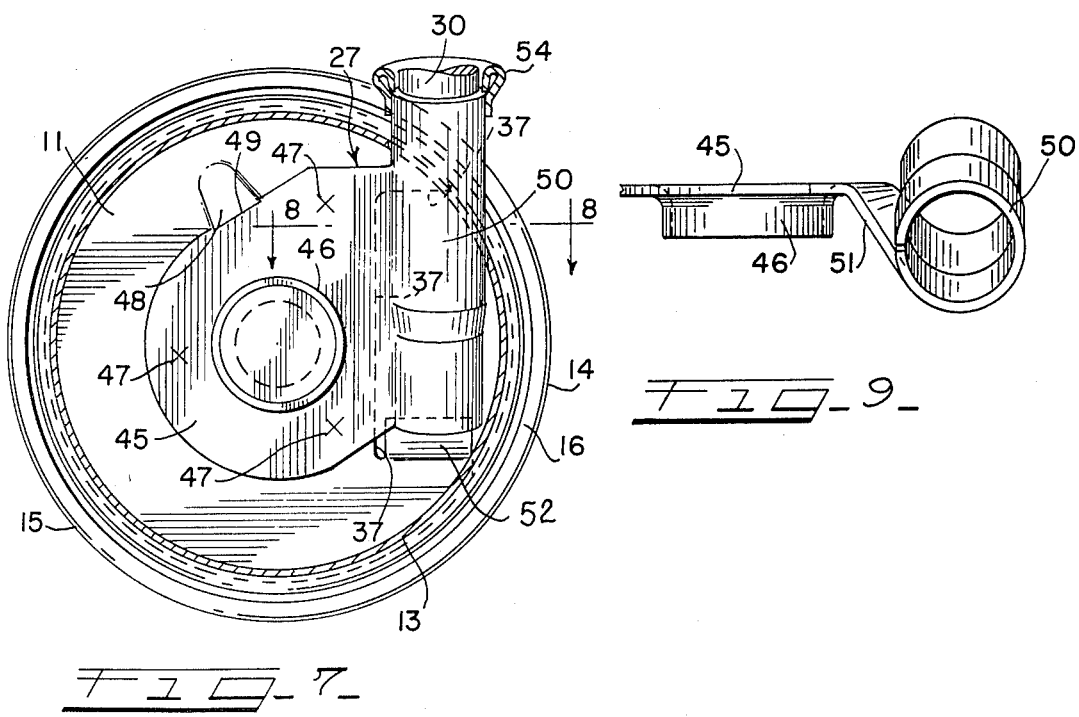

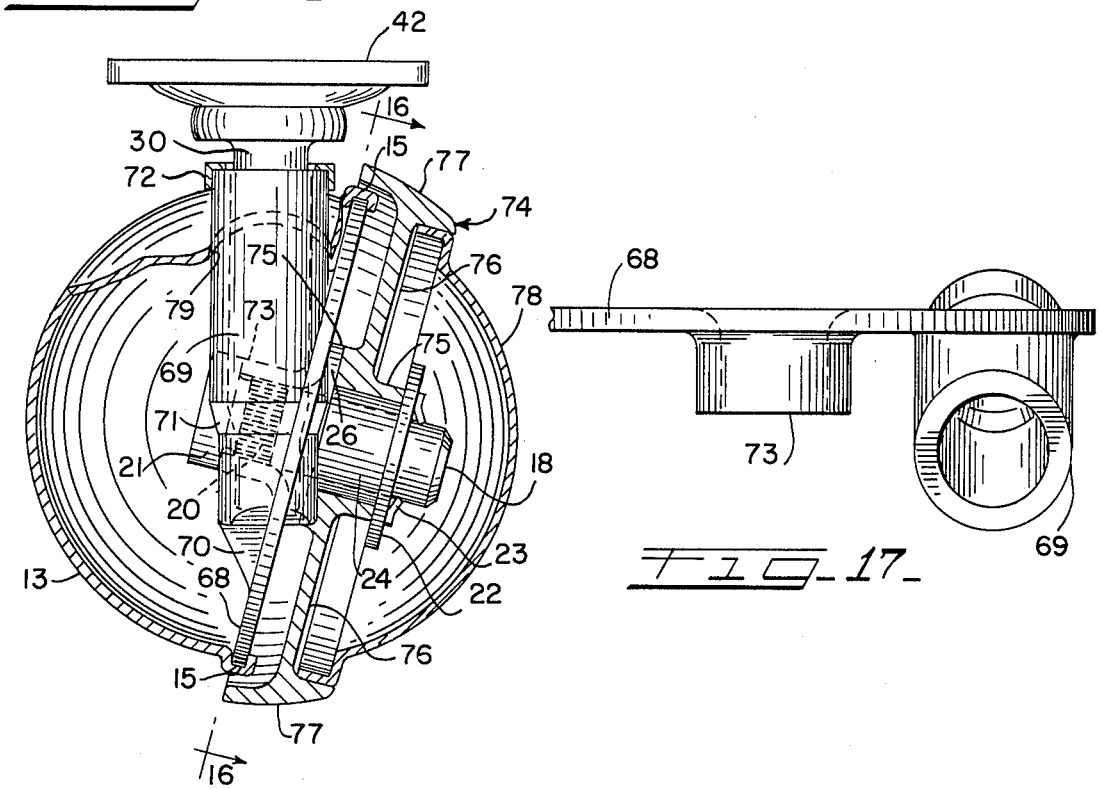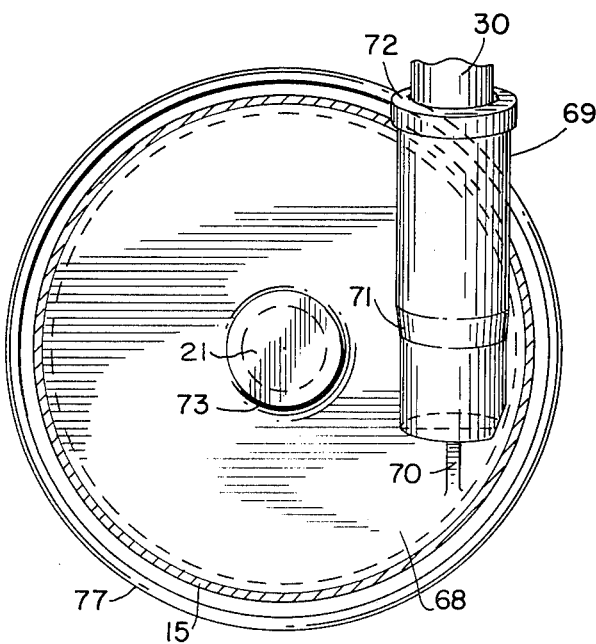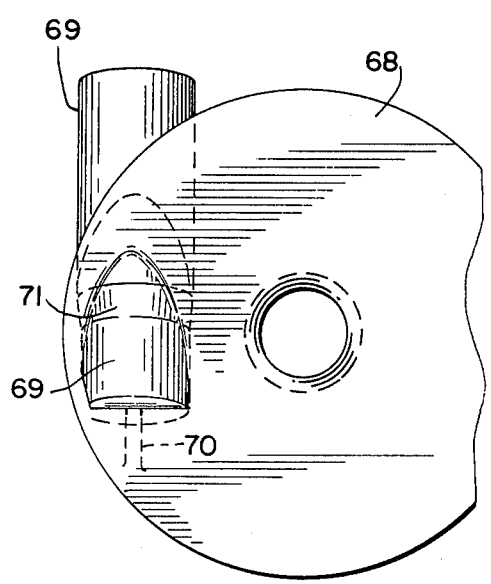

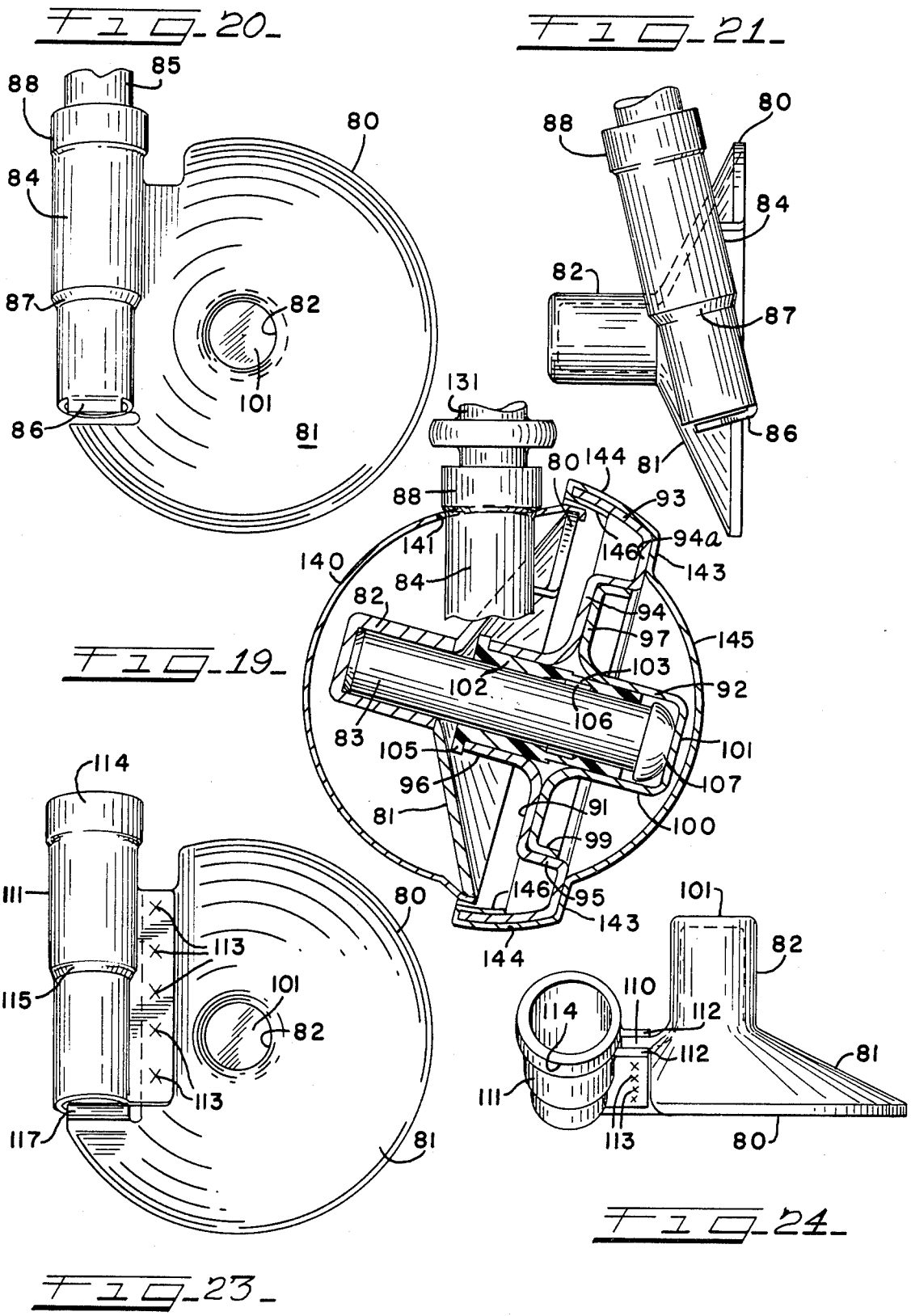

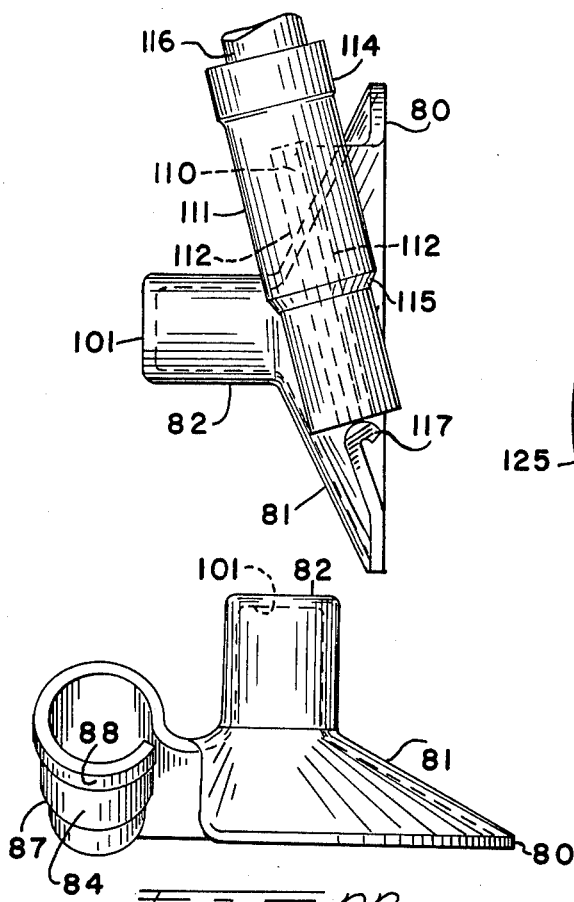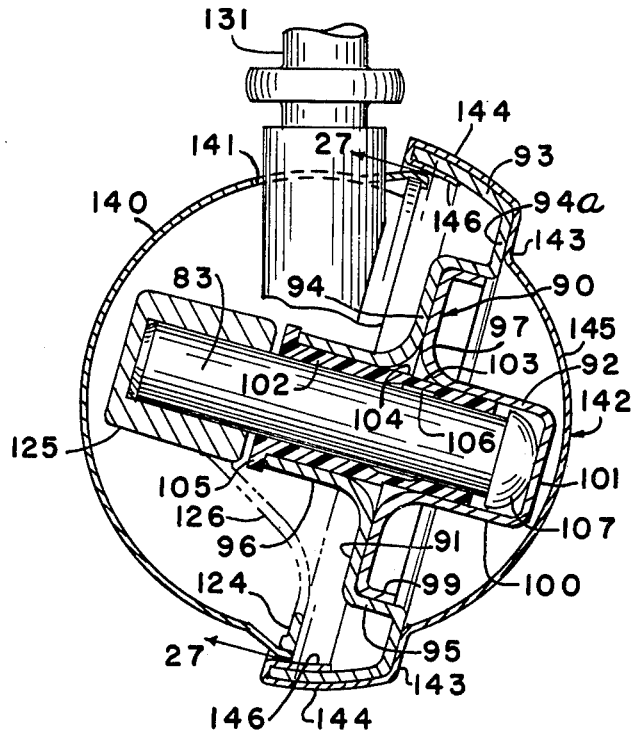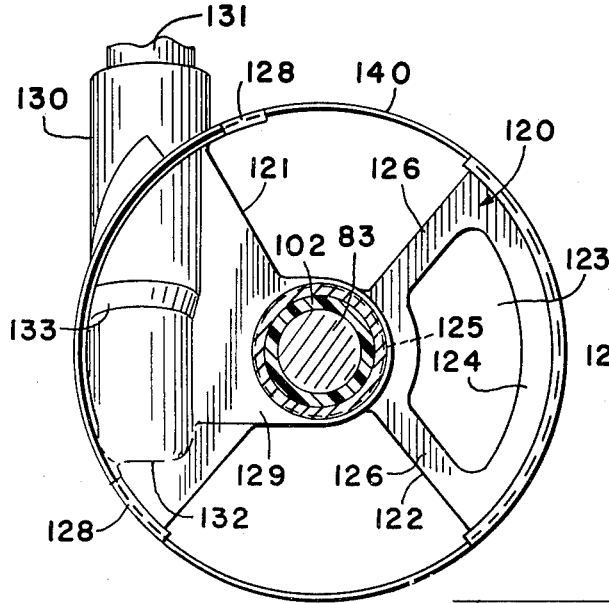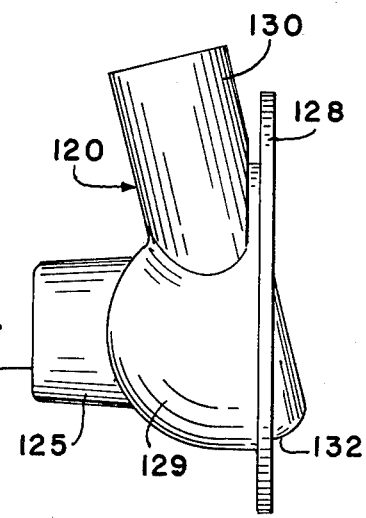

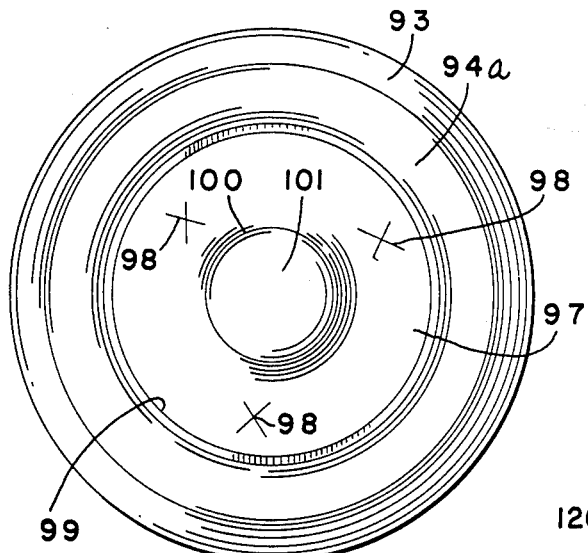
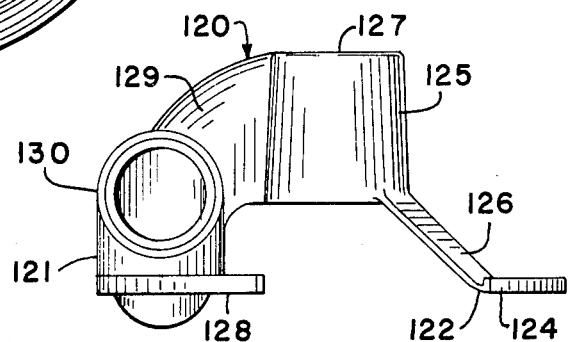
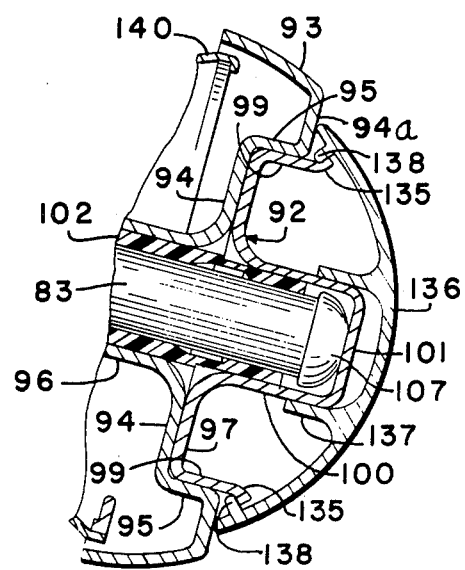

TILTED AXLE CASTER

This application is a division of my copending application Ser. No. 845,427, filed Oct. 25, 1977, now U.S. Pat. No. 4,144,617, which was a continuation-in-part of my application Ser. No. 748,165, filed Dec. 7, 1976, now abandoned.

BACKGROUND OF THE INVENTION

Prior casters have provided arrangements where a supporting wheel, or floor engaging element is rotatably mounted on an inclined axle offset from a vertical pivot axle about which the caster swivels. In such designs the caster consisted of a pair of complemental hemispherical, opposed casting sections to form a generally enclosed hollow shell wherein one of the casting sections was relatively fixed on the vertical pivot and the other casting section constituted the rotatable wheel, or floor engaging roller. Tilted axle casters of this general type permit the hollow shell to swivel about the vertical axle. However, the enclosing sections have always been made up of castings and while they have been made from die castings they necessarily were relatively heavy and consequently costly, both from the standpoint of the casting processes involved and the necessity for sufficient strength in the completed caster to support the relatively heavy loads which the casters were adapted to carry. The amount of material in such casters has become burdensome from a cost standpoint with the constantly increasing cost of materials and as a consequence competitive advantages of casters of superior design are on the verge of being lost to competitive casters and particularly with the advent of the expiration of basic U.S. patents, from foreign competition where producers are able, with lower labor and material costs to furnish a proven caster structure from an expired U.S. patent and thus provide a good caster of fully developed design without having any of the development costs ordinarily entailed in the production of a caster of competitive quality. Such casters can be sold for less than the price of a domestic product which has been developed and produced on the basis of all normal costs included in the marketing price of the caster. Consequently, it has become necessary to reduce the costs involved in producing a caster of new and improved design and representing a suitable structure able to compete on the basis of price as well as quality.

SUMMARY OF THE INVENTION

The present invention provides a caster wherein the manufacturing costs can be reduced both by taking weight and material out of the structure and by providing an enclosed axle tilted wheel caster design capable of efficient manufacture. This has been accomplished primarily by redesigning the caster structure to provide basically two operating parts comprising a circular like body frame in the form of a dished or flat, corrugated or ribbed member carrying a provision for swiveling and an axle and a separate wheel for rotation on the axle. The body frame and the wheel can each be enclosed by a cover, of lightweight construction, secured thereto and which in the assembled caster gives the completed assembly a generally attractive form. An important improvement in the new design is realized from the fabrication of the body frame and the wheel from light weight metal stampings or mouldings and the fabrication of the enclosing covers from thin gauge metal such as aluminum, steel, or plastic, whereby further to lighten the weight of the caster assembly. These parts can be made from other materials which may be suitable for the purpose. Presently it has been found that the metal stampings lend the desired effect most readily, giving the caster assembly the desired strength while reducing the weight of the material used and thereby the cost and are easily fabricated. A lightweight version of the invention with at least certain of the parts fabricated from precision castings, affords realization of certain advantages of the inventive concept and incorporates basic principles thereof by the inclusion of a cast body frame carrying the swivel and the axle and having a wheel of fabricated or cast design rotatably mounted on the axle. Thin gauge metal covers of lightweight and any desired shape are secured on the body frame and wheel respectively to give an overall generally enclosed form to the caster assembly.

OBJECTS OF THE INVENTION

The primary purpose of the invention is to provide a caster of low cost design, having lightweight, fabricated from parts affording required strength properties and having enclosing covers which give the caster assembly an overall generally enclosed form.

The principal object of the invention is the provision of a caster of generally enclosed form fabricated from two basic parts comprising substantially a body frame for mounting a vertical swivel and a canted axle and a separate wheel rotatable on the axle, with enclosing covers of thin gauge metal, lightweight mouldings, or spinnings, secured to each of the basic parts to provide the enclosed form.

An important object of the invention is to provide a caster assembly fabricated from two basic members comprising stamped metal parts, including a substantially circular body frame carrying a swivel mount and an axle and a separate wheel rotatable on the axle, with a cover of thin gauge metal, or light weight mouldings, secured to each of the basic members, giving the assembly an overall generally enclosed form.

Another important object of the invention is the provision of a caster assembly fabricated from two basic members, one or both of which comprises a precision casting, including a substantially circular body frame incorporating a swivel mount, having a supporting axle mounted therein and a separate wheel rotatable on the axle with light weight thin gauge covers secured respectively to the basic members to give the assembly an overall generally enclosed form.

A further object of the invention is to provide a caster assembly fabricated from two basic members comprising the primary operating parts including a substantially circular body frame and a separate wheel rotatably mounted on an axle carried by the body frame and a swivel tube integrally formed on the body frame.

A still further object of the invention is the provision of a caster assembly fabricated from two basic members comprising the primary operating parts of the caster including a substantially circular body frame and a separate wheel rotatably mounted on an axle carried by the body frame and a separately formed swivel tube secured on the body frame.

Another object of the invention is to provide a caster assembly including a generally circular body which is axially dished having an integrally formed swivel tube and an enclosed socket for mounting an axle and a separate wheel fabricated from stamped metal parts including a rim portion and an enclosed hub rotatively mounted relative to the axle.

Still another object of the invention is the provision of a caster assembly including a generally circular body which is axially dished having a separately formed and rigidly attached swivel tube and a separately formed integrally secured socket for mounting an axle and a separate wheel fabricated from stamped metal parts including a rim portion and an enclosed hub rotatively mounted relative to the axle.

Another object of the invention is to provide a caster assembly including an axially dished skeletonized body having an integrally formed enclosed socket for mounting an axle and an integrally formed swivel tube and a separate wheel fabricated from multiple parts including an enclosed hub section and a rim forming section secured together and rotatively mounted relative to the axle.

Another object of the invention is the provision of a caster assembly including a body member having an enclosed axle mounting socket and a swivel mounting tube and a separate wheel member comprising a rim portion having a central web and an annular inner hub and an outer enclosed hub in axial alignment with the inner hub having an outstanding web in engagement with and secured to the central web and a bearing sleeve disposed within the inner and outer hubs for rotative engagement with the axle.

Another object of the invention is to provide a caster assembly having a swivelable body member and a separate wheel member rotatively mounted on an axle carried by the body member with the wheel fabricated from separate parts having respective web portions secured together in face-to-face engagement with one part including an outer rim and an annular inner hub and the other part including an outer enclosed hub in axial alignment with the inner hub having an inner rim extending outwardly from the perimeter of its web portion and a cover enclosing the outer hub having a snap-fit engagement with such inner rim.

DESCRIPTION OF THE DRAWINGS

The foregoing and other and more specific objects of the invention are attained by the structure and arrangement of the caster assembly illustrated in the accompanying drawings wherein FIG. 1 is a general perspective view of a fully assembled caster according to this invention;

FIG. 2 is a sectional view of the caster assembly showing the body frame with attached swivel stem parts, the axle mounted wheel and the covers secured to both;

FIG. 3 is a sectional view of the caster taken on the line 3—3 of FIG. 2;

FIGS. 4 and 5 are detail horizontal sectional views taken on the lines 4—4 and 5—5 respectively of FIG. 3;

FIG. 6 is a sectional view through a caster of modified form;

FIG. 7 is a general vertical sectional view taken on the line 7—7 of FIG. 6;

FIG. 8 is a detail horizontal view taken on the line 8—8 of FIG. 7;

FIG. 9 is a detail view of the swivel tube structure of the type used with the caster of FIG. 6;

FIG. 15 is a generally vertical sectional view of a further modified form of the invention where the body frame and swivel structure as well as the axle mounted wheel are constructed from precision castings and each with a separately attached cover;

FIG. 16 is a sectional view taken on the line 16—16 of FIG. 15;

FIG. 17 is a detail view of the cast body frame;

FIG. 18 is an elevational view of the body frame showing the opposite face thereof from that shown in FIG. 16;

FIG. 19 is a general cross sectional view of a fully assembled caster having a body frame member which comprises a centrally dished, generally circular plate and a wheel fabricated from two parts including a rim and an enclosed hub;

FIG. 20 is an elevational view of the generally circular dished plate body member having an integrally formed swivel tube shown from the side facing the wheel;

FIG. 21 also is an elevational view of the dished plate viewed from an edge of plate and showing the angularity of the swivel tube relative to the plate and an enclosed socket for a fixed axle;

FIG. 22 is a top view of the dished plate, enclosed axle socket and swivel tube;

FIG. 23 is an elevational view similar to FIG. 20 showing a modified form of the body frame member having a separately formed swivel tube rigidly secured to the circular plate;

FIG. 24 is a top view of the body frame and swivel tube structure shown in FIG. 23;

FIG. 25 is a view similar to FIG. 21 showing an edge view of the dished plate and swivel tube structure illustrated in FIGS. 23 and 24;

FIG. 26 is a general sectional view of another form of the invention utilizing a precision cast body frame member; FIG. 27 is an elevational view, partly in section, taken on the line 27—27 of FIG. 26 showing the skeletonized structure of the body frame member and integral swivel tube;

FIG. 28 is an edge view of the body frame member illustrated in FIG. 27 showing the integral swivel tube and an integral socket for a fixed axle;

FIG. 29 is a top view of the precision cast body frame member of FIGS. 26, 27 and 28;

FIG. 30 is a front elevational view of the two part wheel structure with the decorative cover removed showing the rim member and the enclosed hub member; and FIG. 31 is a cross sectional view through a wheel assembly having an outwardly projecting annular flange, or inner rim member, for the attachment of a removable plastic cover.

DESCRIPTION OF FIRST EMBODIMENT

Figure 10:
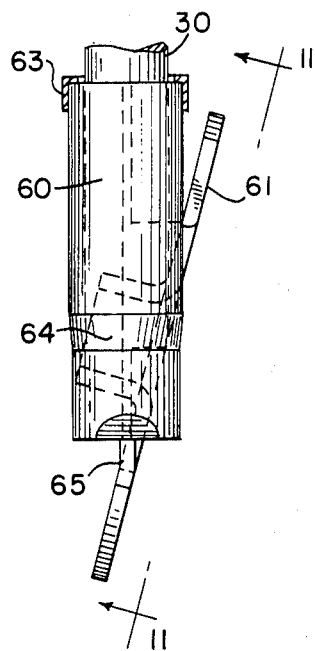
FIG. 10 illustrates a modified form of body frame with integrally attached swivel tube.

In the drawings, as shown in FIGS. 1 through 5, a generally enclosed form of caster assembly 10 is shown as being comprised of stamped metal parts including a body frame 11 which, in this form, is of a generally flat, or pancake-like configuration, a rotatable wheel 12 and light weight metal covers 13 and 14 secured on the body frame and wheel respectively. These covers, as shown here, are secured to the body plate and wheel by crimping the edge of the respective covers over the edge of the body frame, as at 15, and over the edge of the wheel, as at 16. The body frame 11 is disc-like with a centrally disposed inwardly turned collar, or boss which comprises a hub 17 and which thus provides a flanged aperture in which an axle member 18 is fixedly mounted. The body frame 11 is disposed at an angle to the vertical and the axle 18 is perpendicular thereto so that the axle is canted, as best shown in FIG. 2.

The wheel 12 turns on the axle in this position and rotates in a plane perpendicular thereto but the tread or rim 19 of the wheel and the overlying cover portion, is shaped and disposed to engage a supporting surface, or floor, in a normally rolling flatwise engagement. The axle 18 is prevented from turning in the hub 17 by a press fit, knurling, or serrations 20 engaging the inner periphery of the hub and is provided with an inner head 21 which positions the axle in the hub 17. The wheel 12 is held on the axle by a washer 22 which may be of a suitable plastic, or metal bearing material and a lock washer 23. The wheel 12 is provided with a central bearing 24 within the central journal 25 and this bearing also is of a suitable plastic, or metal bearing material, as is the thrust bearing washer 26 at the inner side of the wheel bearing against the body frame 11.

The body frame 11 mounts a swivel tube structure 27 on a vertical axis and in this form of the invention the swivel tube structure 27 is secured to the body frame 11 as a separately formed element comprised of a support bracket 28 and the swivel tube 29, which is adapted to receive the stem 30 for the caster. The support bracket 28 includes a generally tubular socket 31 for the swivel tube 29 and flat portion 32. The flat portion 32 is of double thickness and the socket 31 is formed integrally by wrapping the bracket 28 around a suitable shape, or die, to form the socket. The socket 31 is formed with a tapered portion 33 which conforms with a similarly tapered portion on the tube 29. The swivel tube 29 extends through the socket 31, as best shown in FIGS. 2 and 3, and seats on a shelf 34 formed integrally with the frame 11. The shelf 34 is formed with an upstanding embossment 35 about which the tube 29 fits and is seated. The flat portions of the support bracket 28 comprise a support plate formed with an inwardly directed collar structure 36 adapted to fit over the central hub 17 on the body frame 11, which serves to position and rigidify the bracket on the body frame.

It will be noted that the tubular socket and swivel tube portions of the support bracket are disposed at least partially upon both sides of the plane of the body frame, for which purpose the body frame is provided with cut-out area 37 so that the socket 31 and tube 29 can extend through the body frame 11 at an angle corresponding to the inclination of the body frame from the vertical. The flat portion 32 of the bracket structure 28 is disposed in contiguous relation to the adjoining surface of the body frame 11 and is rigidly secured thereto by clamping brackets 38, struck out of the body frame 11 to hold the bracket 28 in tight engagement with the body frame. This attachment together with the hub structure 36 engaged around the body frame central collar 28 securely positions and maintains the fixed relationship of the entire bracket structure with the body frame. If desired, the bracket structure 28 can be integrated with the body frame by welding, brazing or riveting.

The body frame 11 and the wheel 12 are both formed from metal of similar thickness while the enclosing covers 13 and 14 are formed from thin gauge light weight metal such as aluminum, thin gauge steel, or the like. The body frame and wheel must be of sufficient strength to support the loads imposed but the covers are not subjected to any undue stress and therefore can be applied as purely ornamental. The cover 13 is perforated, as at 39, for passage of the tube 29 therethrough, as best shown in FIG. 1. The cover 14 is closely conformed to the thread 19 of the wheel 12, as best shown in FIG. 2, but since this area of the cover is immediately backed up by the wheel tread 19 no undue forces are required to be supported by the cover. The thread 19 of the wheel 12 and the central journal 25, which forms the hub of the wheel, are integrally connected by web plate 40 which is disposed generally in the outer plane of the wheel and is connected with the central hub portion 25 at the inner side of the wheel by a sloping web portion 41. The tread 19, central hub 25 and intervening web portions 40 and 41 are formed during a stamping operation. The web of the wheel may be reinforced, or stiffened, at regularly spaced intervals around the wheel by means of corrugations 43, if desired or considered necessary.

The stem 30 is secured to a mounting plate 42 which secures the caster on an item of furniture, or the like. The stem 30 swivels in the tube 29 and may be secured therein against inadvertent withdrawal in any suitable manner, as desired. The tube 29 is rigid with the socket 31 and may be integrally secured thereto by welding, brazing or in any preferred manner.

MODIFIED FORM OF THE INVENTION

In the form of the invention illustrated in FIGS. 6 through 9, the body frame 11 and wheel 12 are fabricated from metal stampings, as before, and the swivel tube structure 27 is also separately formed and secured to the face of the body frme. The thin gauge light weight enclosing covers 13 and 14 are secured to the body frame and wheel respectively, in similar manner, with the cover 13 crimped over the edge of the body frame, as at 15 and the cover 14 crimped over the edge of the wheel, as at 16. The body frame 11 is disposed at an angle to the vertical and the axle 18 therefore is canted and disposes the wheel 12 for rotation in a plane parallel to the body frame. The body frame in this form also is flat and disc-like and is provided with an inwardly directed central collar or hub 17, through which the axle 18 extends. The axle is fixed in the hub 17 by serrations, or a press fit as at 20, so that it cannot rotate relative to the collar and is provided with a head 21 which fixes the position of the axle in the hub 17.

The swivel tube structure 27 of FIGS. 6–9 is formed with a flat plate portion 45, having a central collar 46 extending inwardly therefrom and surrounding the central hub 17 projecting inwardly from the body frame 11. The flat plate portion 45 is disposed in surface engagement with the face of the body frame and can be rigidly secured thereto, as by welds 47, or by other means, if preferred. The relative position of the plate portion 45 on the face of the body frame 11 is fixed by a shoulder piece 48 struck out of the body frame 11 and projecting into a recess 49 in an edge of plate 45. The plate 45 is provided with a socket structure 50 integral therewith and which is disposed vertically so that it is disposed at an angle to the integral plate portion 45. A sloping plate portion 51 connects the socket 50 with the flat plate portion 45 at the angle defined by the vertical disposition of the socket and the angled position of the plate 45 on the body frame.

The tubular socket 50 is seated on a shoulder 52 formed integral with and bent from the body frame 11 to a horizontal position underlying the bottom end of the socket (see FIG. 6). The socket 50 may be secured to the shelf formed by the shoulder 52 by welding or brazing, if desired. As in the previous form of the invention the tubular socket 50 extends at least partially through the body frme 11 at an angle corresponding with the canted position of the body frame from the vertical. The socket 50, as described, is integral with the sloping plate portion 51 and the flat plate portion 45 and is formed by rolling the metal about a suitable form, or die, of the proper diameter and having the tapered area 53 in the final form of the tube. The upper end of the tubular socket 50 is provided with a separately formed collar piece 54 secured thereto, as by welding, or brazing. The caster stem 30 fits into the socket through the collar piece 54 and the mounting plate, or bracket 42, is secured to the stem. As in the previous form, the body frame 11 is provided with a cut-out area 37 for the passage of the tubular socket 50, whereby the socket structure can be disposed in a position extending upon opposite sides of the body frame.

The wheel 12 rotates on the axle 18 and includes a central hub 55 extending inwardly from a web portion 56 disposed in the outer plane of the wheel and which integrally connects the hub with the tread portion 19 of the wheel. The hub 55 is fitted with an internal bushing of plastic, bronze, sintered metal, or other suitable bearing material 24 and a thrust bearing washer 26 of similar material is disposed at the inner side of the wheel between the bearing areas of the inner end of the hub 55 and adjacent surface of the body frame 11. A washer 22, of suitable bearing material, is disposed on the axle at the outer face of the wheel and secured by a locking washer 23. Stiffening corrugations 57 may be formed in the web 56 of the wheel at regularly spaced intervals around the wheel, if desired.

FURTHER MODIFIED FORM OF THE INVENTION

Figure 12:
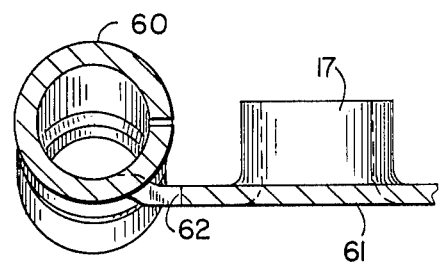
FIG. 12 is a horizontal detail sectional view taken on the line 12—12 of FIG. 11 showing the integral structure of the swivel tube with the body frame.
Figure 11:
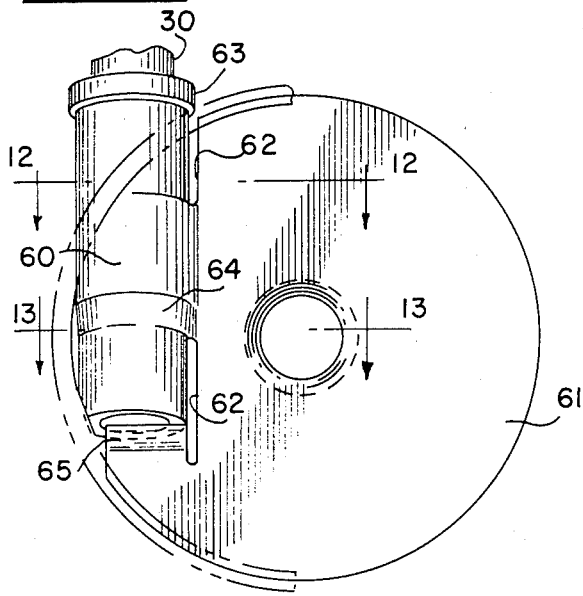
FIG. 11 is an elevational view of the body frame from the plane 11—11 of FIG. 10.
Figure 13:
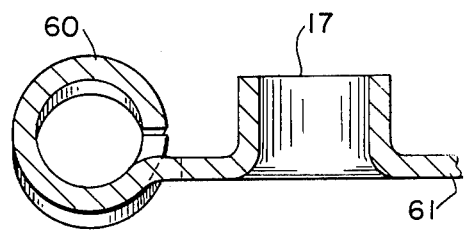
FIG. 13 is a detail horizontal sectional view taken on the line 13—13 of FIG. 11.
Figure 14:
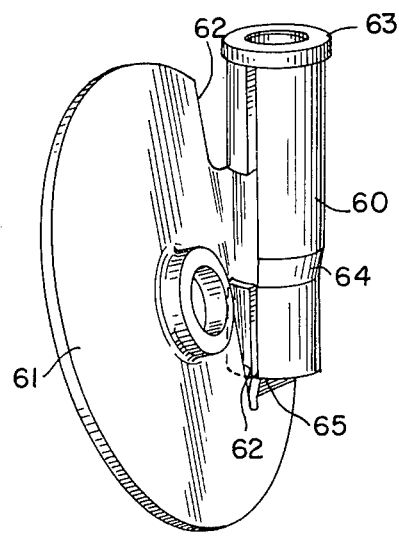
FIG. 14 is a perspective view of the body frame and integral swivel tube of FIGS. 10 and 11.

A concept illustrated in FIGS. 10 through 14 is directed to a modification in the design of the body plate 11 wherein the flat disc-like plate and associated swivel tube structure are of one piece construction with the swivel socket integral with the body frame. As shown in FIG. 10, the integrally formed swivel socket 60 is disposed vertically and the body plate 61 occupies a position at an angle to the socket. As best shown in FIG. 11, the body frame 61 is cut out, as at 62, where the swivel socket 60 is formed and it will be seen that the swivel socket is formed by wrapping the metal in this area around a suitable die, or the like, to form the tubular section comprising the swivel socket, which is best illustrated in FIGS. 12 and 13.

PRECISION CAST VERSION OF THE INVENTION

The basic concept of the invention is followed in the caster arrangement shown in FIGS. 15 through 18, but the various caster parts take the form of precision castings in this design, although the enclosing covers giving the caster assembly its form continue as thin gauge, light weight aluminum, or steel shapes that are crimped, or snapped into place. The body frame casting 68 is canted at an angle to the vertical and the integrally cast swivel socket 69 is disposed vertically, with portions thereof disposed upon opposite sides of the sloping plane of the body frame 68, as best indicated in FIGS. 15 and 18. An integral gusset 70 rigidifies and supports the bottom end area of the socket 69 where it is joined with the body frame 68 and as shown in FIGS. 15, 16 and 18, this cast socket member 69 is also provided with the tapered section 71. The upper end of the swivel socket is provided with an encircling collar 72 and the stem 30, projecting downwardly from the mounting plate 42 for the caster, is entered into the socket 69 through this collar.

Integrally cast central collar or hub 73 extends inwardly from the body frame 68 and provides a bearing for the canted axle 18 extending therethrough, with the head 21 on the axle acting as a stop against the inner end of the hub 73 to position the axle relative to the body frame and having serrations 20 on the axle to prevent its relative rotation in the hub. The cast wheel 74 rotates on the canted axle and therefore runs in an angular plane relative to the vertical, as dictated by the angle of the axle 18. The wheel is cast as one piece and includes a central hub 75 with an integrally cast peripheral tread 77 which is formed to provide a supporting surface on the caster running substantially flatwise relative to a supporting surface, or floor. The wheel web 76 is disposed midway on the width of tread 77, as shown in FIG. 15 thus providing a first tread portion at one side of the web 76 and a second tread portion at the other side of the web.

A central bearing 24 is mounted in the hub 75 and is made from a suitable plastic, bronze, or sintered metal material which affords a reduced friction running surface on the axle. A thrust bearing washer 26 is disposed between the inner face of the central hub 75 and the adjoining face of the body frame 68 and this thrust bearing is also made from a suitable bearing material affording a reduced frictional engagement between the wheel and the body frame. Washer 22 at the outer side of the wheel 74 is made from a similar material and a lock washer 23 secures the assembly and holds the wheel on the axle. The thin gauge light weight aluminum, or steel cover 78 on the wheel, fits into the inner periphery of the tread 77 under the second tread portion, as best shown in FIG. 15 and is adapted to be pressed, or snapped into place, but the cover 13 is crimped over the edge of the body frame 68, as at 15, similarly to the manner of securing this cover on the other forms of casters hereinbefore described. An opening 79 in the cover 13 provides for the projection of the swivel socket 69 through the cover to receive the stem 30 for mounting the caster on an item of furniture, or other equipment, by means of the mounting plate 42.

PREFERRED EMBODIMENT OF THE INVENTION

This embodiment of the invention incorporates a dished body frame member of generally circular plate-like form and a wheel member fabricated from separate parts secured together to form a rigid assembly. The generally circular body member comprises a dished plate 80 which is dished axially, as at 81, from the outer perimeter toward the center of the circular plate, as best revealed in FIGS. 19, 20, 21 and 22. The dished portion 81 merges into a centrally disposed aperture which may be closed at the outer end thereof to form a closed socket or hub 82, which fixedly mounts one end of an axle 83 pressed into the hub and fixed against rotation; as best shown in FIG. 19.

The dished circular plate body member incorporates an integral swivel tube 84 to receive a stem 85, by means of which the caster is swivelly mounted on an article to be supported by one or more of such casters. A bottom plate portion 86 extends under the lower end of the swivel tube 84 to act as a limit stop, or support, for the stem 85. The swivel tube 84 includes a tapered portion 87 intermediate its top and bottom ends, which conforms with a similarly formed shoulder on the stem 85 to provide an effective supporting bearing between the stem and swivel tube. At its top end the swivel tube 84 is formed with a reinforcing collar 88 and the caster stem 85 extends into the swivel tube through this rigidifying top collar portion.

The integral swivel tube 84 as in previous forms of integral construction, is constructed by forming, or rolling the metal about a suitable die of the proper diameter, incorporating the tapered shape for the bearing portion 87, whereby the integral tube is shaped and disposed at the proper angle relative to the body plate 80 such that, in the operative position of the caster, the swivel tube 84 and mounting stem 85 are disposed vertically.

The swivel socket tube 84 being operable about a vertical axis in operation and disposed at an angle to the body plate 80, disposes the body plate 80 in a canted position with the axle 83 projecting outwardly at an angle to the horizontal, having its axis at ninety degrees (90°) relative to the canted plane of the body plate.

The axle 83 is fixedly secured in the mounting socket 82 by a pressed fit, or it may include serrations so that, in either event, it is prevented from rotating in the socket relative to the body plate 80. Because of the canted position of the body plate the swivel tube structure 84 is disposed upon opposite sides of a plane represented by the face of the body plate so that the swivel tube extends at least partially through the body plate with its bottom end projecting beyond the outer plane of the plate and its upper end disposed at the inner side of the body plate. As in previous versions, the body plate 80 is cut out at 62, as best indicated in FIG. 20, so that the swivel tube structure 84 can extend through the plane of the body plate to project upon opposite sides thereof at the top and bottom ends of the swivel tube structure.

The axle 83 rotatively supports a wheel structure assembly 90, which is of similar construction in the several forms of the invention hereinafter to be described. The wheel assembly includes two separately formed members 91 and 92 comprising a rim member and an outer hub member respectively. The member 91 has an outer annular rim 93 formed integrally with a central web 94 which is offset at 95 to dispose that portion 94$^a$ of the web structure adjacent to the periphery of the wheel in a plane spaced outwardly from the plane of the central web portion 94 so that the rim 93 is generally centered over the central web 94. The central web 94 is formed with a flanged annular collar 96 comprising an inner hub for the wheel which cooperates in the mounting of the wheel assembly on the axle 83.

The wheel member 92 has a web structure 97 disposed in face-to-face engagement with the web 94 and rigidly secured thereto by welding, as indicated at 98 in FIG. 30. The web 97 is flanged outwardly about its periphery, as at 99 and this outwardly extending annular flange underlies the outwardly directed offset 95 in the web 94. Web portion 97 merges with an outwardly extending hub 100, integrally formed with the web 97 and which is disposed coaxially with the inner hub 96. The outer end of the hub 100 is closed as at 101 so that the end of the axle 83 is fully enclosed by the hub structure. A bearing sleeve 102 extends into the combined hub structure 96 and 100.

The outer hub 100 has an inside diameter which is somewhat less than the inside diameter of the inner hub 96 so that the bearing sleeve has an outside diameter 103 where it fits into the outer hub 100 and an outside diameter 104 where it fits in the inner hub 96. The bearing sleeve 103 has a cored out recess 106 in its inner surface located in the area of the change in outside diameters 103 and 104 of the sleeve. At its inner end an outwardly extending flange 105 on the bearing sleeve 102 overlies the inner end of the hub 96 while the inner end of the sleeve 103 terminates in the outer hub 100 short of the end of the axle 83.

The axle 83 is assembled into the hub structure 96/100 of the wheel assembly 90 prior to the mounting of the axle in the body frame hub 82. The axle has a head 107 and as referred to above the bearing sleeve 102 at its inner end stops short of the shoulder formed by the axle head. The sleeve 102 is mounted on the axle 83 and the assembled axle and bearing sleeve are inserted into the hub structure 96/100 with the axle head 107 bearing against the inner face of the hub end closure 101 and the outstanding flange 105 overlying the inner end of the inner hub 96. The sleeve 102 thus is disposed between the hub structure 96/100 and the axle where it provides a bearing surface for the rotation of the wheel 90 on the axle 83. With the wheel and bearing sleeve mounted thereon, the axle 83 is then pressed into the hub 82 of the dished body member 80 and the engagement between the axle head 107 and the end closure 101 serves to facilitate the driving of the wheel and axle assembly into operative engagement with the hub 82. Thus, with the axle fixed against rotation in the body frame hub 82 the wheel will rotate on the axle with the sleeve 102 forming a bearing between the wheel hub structure and the axle.

MODIFIED BODY FRAME MEMBER

FIGS. 23, 24 and 25 illustrate a modified construction of the generally circular dished body frame plate 80 wherein the circular plate is of generally similar construction to that described in FIGS. 19–22 with the plate 80 being axially dished, as at 81, from the outer perimeter portions of the plate inwardly toward the center where it merges with the axle hub 82 having the enclosed end 101. It should be pointed out that the axle hub 82 might be formed integrally with the dished plate 80, either in the form of the plate shown in FIGS. 19–22, or in the form of FIGS. 23–25.

The body frame member 80 of FIGS. 23–25 differs from the construction of this generally circular plate member as shown in FIGS. 19–22 in that a separate swivel tube structure 111 is provided that is rigidly secured to the body plate, preferably by welding. This body plate 80 is cut away in the area of the swivel tube as at 62 and is provided with an integral flange 110 that extends vertically in the operative position of the caster so that the body plate member 80 is canted in relation thereto (see FIG. 25). This flange 110 is provided for the attachment of a separate swivel tube structure 111, also disposed vertically and disposed at an angle to the body plate member corresponding with the relative angle of the flange 110 so that the generally circular body plate member 80 is canted relative to the swivel tube 111 in a manner similar to the previously described form of the body plate structure.

The separately formed swivel tube structure 111 is provided with a pair of integrally formed, vertically extending spaced apart flanges 112 which straddle the flange 110 on the body plate and afford a means of securing the swivel tube to the body plate 80. The flanges 112 sandwiched over the flange 110 are secured thereto as by welds 113 as best indicated in FIGS. 23 and 24. The swivel tube 111 is provided with a top reinforcing collar 114 surrounding the top end of the tube through which a mounting stem 116 is inserted and an intermediate tapered portion 115 affords an internal bearing seat for the stem. The body plate 80 at the position where it underlies the bottom end of the swivel tube 111 is formed to provide a limit stop, or support for the lower end of the stem as at 117. This limit stop is integral with the body plate and is formed by bending over that portion of the body which extends under the swivel tube, as at 117 (see FIG. 25 where this feature is best illustrated).

The swivel tube structure 111 in this form of the invention occupies the same position and angularity relative to the circular body plate member 80 as in the previously described form and the wheel and axle assembly is mounted in the body plate structure in the identical manner and relationship so that the caster wheel 90 is adapted to rotate relative to this body frame member in the same manner as described for the assembly illustrated in FIG. 19.

PRECISION CAST BODY FRAME MEMBER

FIGS. 26, 27, 28 and 29 illustrate another embodiment of the invention wherein a precision cast, skeletonized body frame member 120 is utilized to mount the wheel instead of the dished circular plate of the previous forms of the invention. The same wheel structure 90 is used with this body frame and therefore the same reference characters have been used in FIG. 26 for the wheel assembly as was used in describing the wheel structure of FIG. 19 since the wheel assemblies are identical. The cast body frame 120 is not continuous around the entire circumference of the caster but is of a skeletonized open framework type of construction including two segments 121 and 122.

The segment 122 is of open construction as at 123 includes a rim portion 124 integrally connected with a centrally disposed axle hub 125 by ribs 126. The axle hub includes an integral enclosed end wall 127 whereby the mounted end of the axle 83 is fully enclosed within the hub where it is supported and held against rotation. The axle, having the wheel structure 90 assembled thereon, is pressed into the hub 125 and may be provided with serrations (not shown) further to prevent relative rotation. The axle 83 may be driven into the hub 125 and this operation is facilitated by the contact engagement of the wheel structure closed hub end 101 with the axle head 107.

The segment 121 also includes a rim 128 connected with the axle hub structure 125 by intermediate body structure 129 including an integrally formed swivel tube 130. The structure connecting the rim 128 and hub structure 125 is quite substantial because the stresses involved in supporting and transferring the loads encountered in actual use are very heavy and must be carried from the mounting stem 131 into the swivel tube structure 130 and into the axle hub 125 and thence to the wheel assembly rolling on a supporting surface. The forces involved therefore must be transferred between the swivel mounting adjacent to the rim of the body frame and the central axle hub so that the structure in this area of the body frame must be exceptionally strong whereas the segment 122 can be of relatively light construction inasmuch as it merely provides an attachment for a decorative cover more fully hereinafter to be described. As best indicated in FIGS. 28 and 29 the cast body frame intermediate structure 129 integrally connecting the axle hub 125 at the center of the body frame 120 with the outer segmental rim portion 128 is of strongly reinforced construction for transferring the stresses involved between these areas. As shown, the structure 129 is of heavy section with sufficient metal in the section to carry the forces encountered and as distinguished from the open framework of the segment 122 the structure 129 of segment 121 is of continuous closed construction, as best shown in FIG. 27. The axle hub 125 also is heavily reinforced, as best indicated in FIG. 26, for the rigid mounting of the axle 83 therein.

The integral swivel tube structure 130 incorporates its own bottom closure, or limit stop, which comprises a bottom end wall 132 and like the previously described swivel tubes this cast structure includes an intermediate tapered portion 133 affording a seat for stem 131. It will be seen that this cast swivel tube 130 is also disposed vertically in the normal operating position of the caster and is disposed at an angle to the operating plane of the body frame which therefore is disposed in a canted position corresponding to the angularity of the swivel tube relative to the generally inclined plane of the body frame, as best indicated in FIG. 26. Accordingly, the swivel tube structure extends upon both sides of the general plane of the segment 121 with the upper main body section disposed to a major extent on the inner side of the segment and the bottom end of the swivel tube extending at least partially through the plane of the segment to the outer side thereof. This is clearly shown in FIG. 28 but is also indicated in FIG. 29 and in FIG. 27 as well.

MODIFIED WHEEL STRUCTURE

The caster assembly illustrated in FIG. 31 is of similar construction to the caster assemblies heretofore described but the wheel structure is modified in respect to the outer wheel member 92. The outwardly extending annular flange 99 in this modified structure projects outwardly beyond the face of the web portion 94$^a$ and is provided with a flared lip 135 that is continuous and extends entirely around the outwardly extending flange. A cover 136 is provided for the outer side of the wheel and this cover is centered on the wheel by means of an inwardly directed socket 137 which fits over the closed hub 100 of the outer wheel member 92.

The cover 136 also includes an inwardly directed annular flange 138 which extends continuously entirely around the inside face of the cover and engages over the flared lip 135 on the flange 99 to secure the cover on the wheel by means of a snap-fit engagement of the flange 138 over the lip 135. The cover 136 may be constructed of nonmetallic material such as a suitable impact resistance plastic and is shaped to form a portion of a sphere terminating at the face of the web portion 94$^a$ so that the edges thereof are spaced inwardly of the wheel rim 93 when the covered is installed on the projecting lip 135.

In this form of the wheel the rim tread, or 93 has direct contact with a supporting surface and rolls on such surface without the interposition of any part of the wheel cover. The annular rim 93 and the web portion 94$^a$ of the wheel assembly may have a suitable plating applied thereto as a decorative feature, if desired, or the rim 93 may have a nonmetallic tread (not shown) applied thereto, such as a suitable plastic material, or a resilient tread material, for use of the caster on uncarpeted floors.

DECORATIVE COVERS ON WHEEL AND BODY FRAME

As best shown in FIGS. 19 and 26 the caster assemblies are provided with decorative metal covers which are of light weight thin gauge construction and are mounted respectively on the body frame members and on the wheel assembly to give the caster assemblies a generally spherical appearance. The covers are of similar construction in the form of caster shown in FIG. 19 and in the form shown in FIG. 26. The body frame cover 140 is of generally hemispherical shape and in FIG. 19 is crimped over the edge of the generally circular body plate 80 for attachment thereto while in FIG. 26 this cover is crimped over the edge of the segmental rim portions 124 and 128 to provide the attachment and in the areas between the segments 121 and 122 the crimped over portion of the cover is omitted, as best revealed in FIG. 27. However, in the form of the invention shown in FIG. 26, the cover 149 may have a snap-fit engagement with the segments 121 and 122, if preferred, and whereby the cover would be snapped onto the rim portions 124 and 128. The cover 140 is provided with an opening 141 for the passage of the swivel tube 111, or 130, as the case may be, so that the swivel tube is accessible for the mounting stems 116 or 131.

The cover 142 for the wheel assembly also is of generally hemispherical shape but includes an offset 143 lying flat against the web portion 94$^a$ of the wheel and extending between the rim portion 144 of the cover and the central spherical portion 145 covering the outer hub portion of the wheel assembly. The rim portion 144 lies in full surface engagement with the wheel rim 93 and rolls on the supporting surface fully backed up by the wheel rim so that even though the cover 142 is of light weight thin gauge metal, no damage can be inflicted on the cover flange 144 in the face of its structural support by the wheel rim. The rim portion 144 of the wheel cover 142 is crimped over the inner edge of the wheel rim 93 and flanged under the rim, as at 146, whereby a positive attachment of the cover onto the wheel assembly is provided. Thus, the covers 140 and 142 fully enclose the caster assembly and provide a caster of attractive and generally spherical appearance.

From the foregoing it will be seen that there has been provided a caster comprised of a generally circular body frame member which may be axially dished, or disc-like and a separate wheel member which may be made from metal stampings, or at least one from precision castings, which may be skeletonized and each having a thin gauge, light weight cover attached thereto to provide a caster of generally enclosed form when the several parts are assembled. The body frame carries a fixed axle which is canted at an angle such that the wheel rotates thereon in a plane at an angle to the vertical and a vertically disposed swivel socket, also on the body plate, provides for connection of the caster assembly to an article of furniture, or equipment. By the construction of this design a caster of light weight has been provided wherein the manufacturing costs have been substantially reduced and wherein the caster is of suitable design for efficient manufacture whereby to afford a completed caster assembly capable of competing with other caster arrangements on the basis of cost, or light weight.

I claim:

1. A caster comprised of two basic parts including a substantially flat body frame and a separate wheel rotatable relative to the body frame, said body frame being fabricated from a metal stamping and having a vertical swivel tube socket separately formed and mounted thereon, means securing said swivel socket to the body frame, a canted axle mounted on the body frame, said wheel being fabricated from a metal stamping and rotatable on said axle, a pair of enclosing covers secured respectively to said body frame and to said wheel, said swivel tube socket extending at an angle to the plane of said body frame and at least a portion of said socket extends through the body frame, and a cut-out in the body frame for the passage of said socket.

2. A caster as set forth in claim 1 wherein said body frame is formed with an integral shelf upon which one end of said socket is seated.

3. A caster as set forth in claim 1 wherein said covers each comprise a hollow thin gauge sheet metal shell.

4. A caster as set forth in claim 1 wherein said flat body frame is of fabricated construction and said swivel tube socket is formed as an integral part of said body frame.

5. A caster as set forth in claim 1 wherein said integrally formed vertical swivel tube socket occupies a position at an angle to the flat body frame and having at least said portion thereof extending through said cutout in the body frame and a portion of said body frame is formed to provide a support integral with the body frame underlying an end of said tube.

6. A caster as set forth in claim 1 wherein said body frame and swivel socket include concentrically engaged collars whereby said swivel socket is positioned on the body frame for securement by said securing means.

7. A caster as set forth in claim 6 wherein said securing means comprises one or more brackets on said body frame engaging a support plate on said swivel socket.

8. A caster as set forth in claim 7 wherein said support plate is welded to said body frame.

9. In a caster assembly comprised of two basic parts including a body frame and a wheel rotatably mounted relative to an axle carried by the body frame, said body frame having a vertical swivel tube socket formed as an integral part of the body frame, a thin gauge sheet metal shell enclosing one side of said body frame and said swivel tube socket, said metal shell extending over the peripheral edge of the body frame and crimped over such edge to secure the shell on the body frame, said wheel having a tread portion overlying said crimped over metal shell, and a thin gauge sheet metal shell enclosing the open side of the wheel and secured to a tread portion, said caster assembly being characterized by the fact that said wheel is comprised of two basic parts including a first member having an annular rim and an annular inner hub connected by an intermediate web, a second member having an annular outer hub in axial alignment with the inner hub and an integral web disposed in face-to-face engagement with said intermediate web and secured thereto, and a bearing sleeve in said aligned hubs between the wheel structure and said axle.

10. A caster assembly as set forth in claim 9 wherein said axle has a head on one end disposed in said outer hub and the outer hub has a closed end enclosing said head.

11. A caster assembly as set forth in claim 10 wherein said sleeve is nonmetallic with a flanged outer end overlying the inner end of said inner hub with the inner end of the sleeve terminating in proximity to said axle head.

12. A caster assembly as set forth in claim 9 wherein said intermediate web has an offset inwardly of said rim and said web on the outer hub having an outwardly turned flanged underlying said offset.

13. A caster assembly as set forth in claim 12 wherein said outwardly turned flanged extends beyond the outer face of said first member, and a cover enclosing said outer hub having a snap-fit engagement with said outwardly turned flange.

14. A caster assembly as set forth in claim 9 having a tread material mounted on said annular outer rim.

* * * * *